(12) United States Patent
Bonnet

(10) Patent No.: US 6,236,008 B1
(45) Date of Patent: May 22, 2001

(54) AUTOMATED SHUTTLE SORTER FOR CONVEYORS

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/337,298

(22) Filed: Jun. 21, 1999

Related U.S. Application Data

(62) Division of application No. 08/905,895, filed on Aug. 4, 1997, now Pat. No. 5,984,078.

(51) Int. Cl.[7] ............................................. B07C 5/00
(52) U.S. Cl. .................... 209/583; 209/542; 209/546; 209/576; 209/556; 209/557
(58) Field of Search ................... 209/542, 546, 209/576, 556, 557, 583; 193/31 R, 31 A, 35 MD, 35 G, 37; 198/349.5, 349, 355, 358, 361, 621.1, 370.1, 370.01, 575, 576, 583, 597, 601

(56) References Cited

U.S. PATENT DOCUMENTS

| 2,062,604 | 12/1936 | Paxton . |
| 3,231,068 | 1/1966 | Harrison et al. . |
| 3,348,678 | 10/1967 | Flowers . |
| 3,838,763 | 10/1974 | Rooke et al. . |
| 3,926,298 | 12/1975 | Miller et al. . |
| 4,174,774 | 11/1979 | Bourgeois . |
| 4,798,275 | 1/1989 | Leemkuil et al. . |
| 5,421,446 | 6/1995 | Koch et al. . |
| 5,433,311 | 7/1995 | Bonnet . |
| 5,489,017 | 2/1996 | Bonnet . |
| 5,501,313 | 3/1996 | Bonnet . |
| 5,509,526 | 4/1996 | Bonnet . |
| 5,547,084 | 8/1996 | Okada et al. . |
| 5,570,773 | 11/1996 | Bonnet . |

FOREIGN PATENT DOCUMENTS

| 1 296 093 | 5/1969 | (DE) . |
| 2448944 | 12/1980 | (FR) . |
| 59-047895 | 9/1985 | (JP) . |

*Primary Examiner*—Donald P. Walsh
*Assistant Examiner*—Mark J. Beauchaine
(74) *Attorney, Agent, or Firm*—Alston & Bird LLP

(57) ABSTRACT

A conveyor sorter includes a shuttle moving transversely to the conveyor direction to place in the path of articles either a pass-through conveyor or a diverting conveyor. The shuttle is mounted on a reversible belt drive and preferably has two diverting conveyors, one on either side of the pass-through conveyor. Multiple shuttles can be installed in series along the main conveyor to allow sorting to many destinations. Large packages can be sorted at high speed, and the shuttle can be replaced easily to reduce down time when repairs are needed.

7 Claims, 4 Drawing Sheets

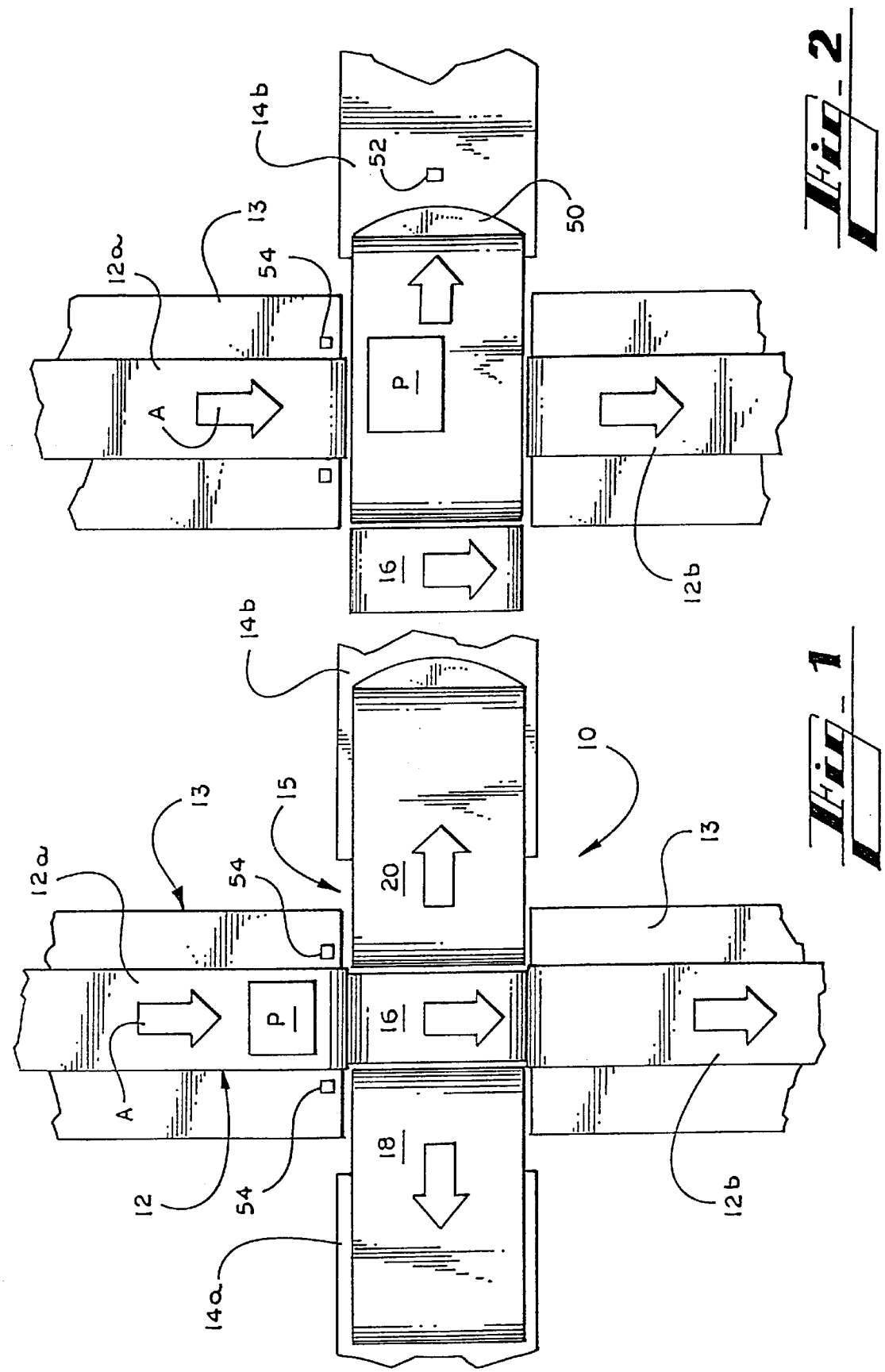

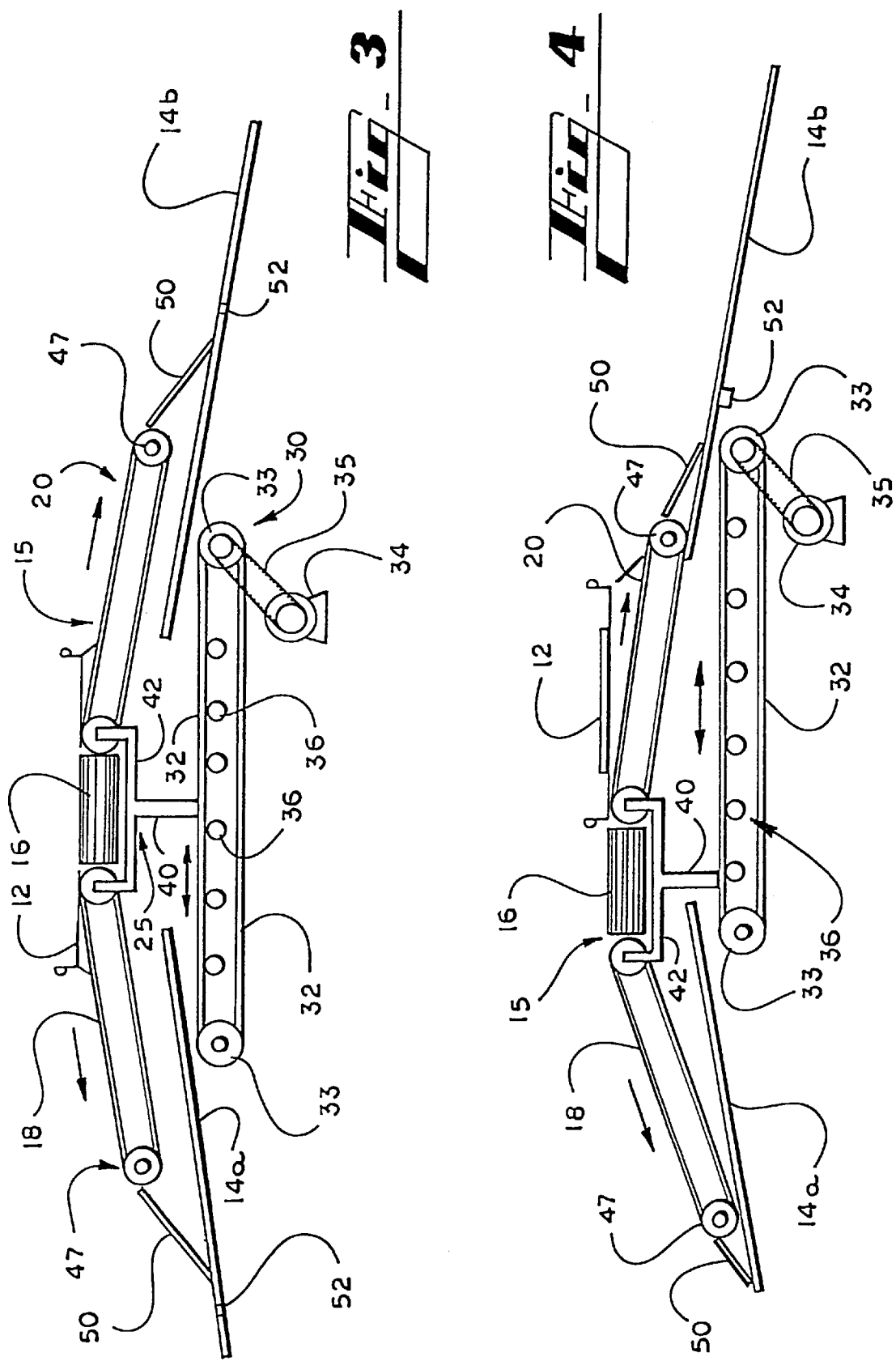

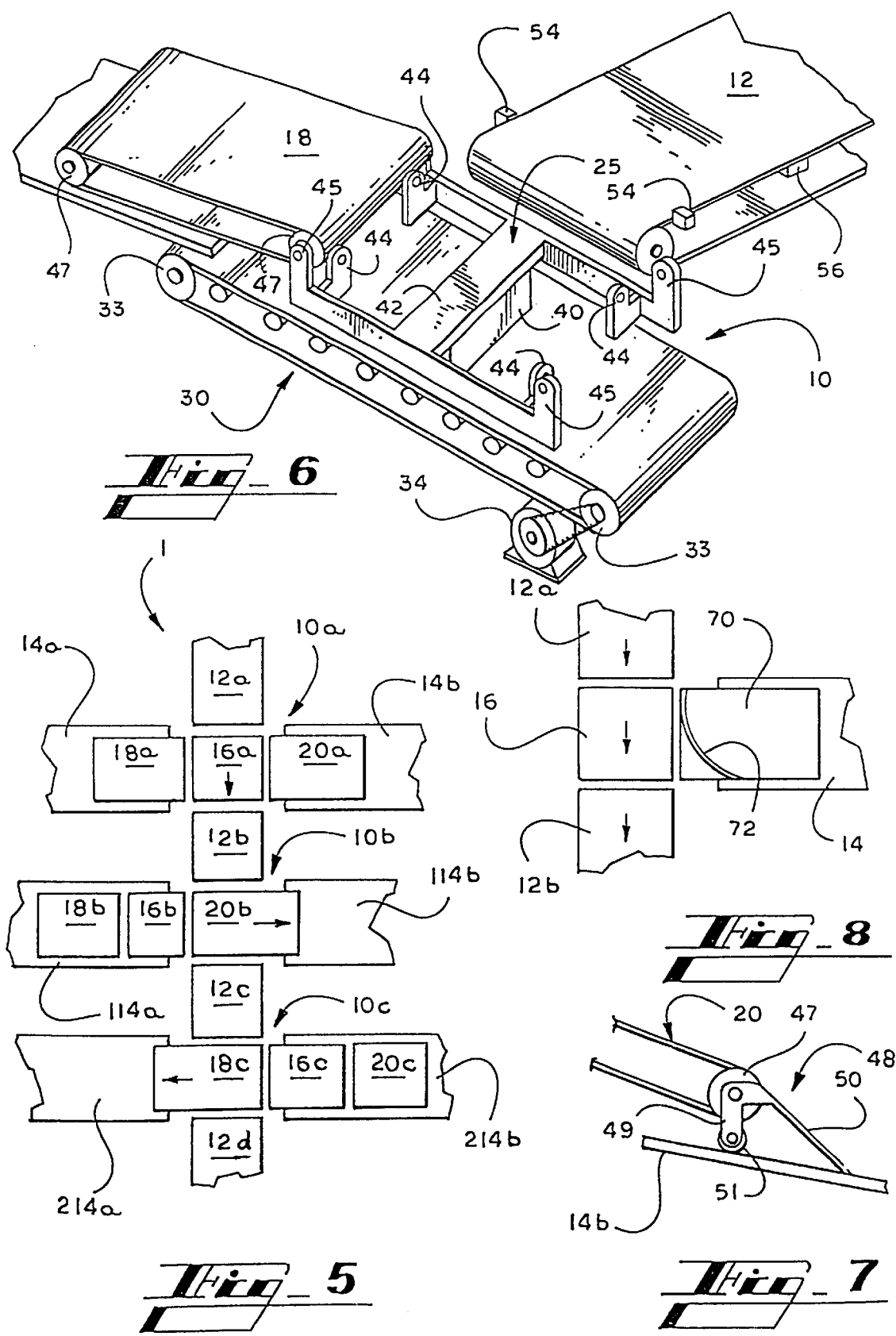

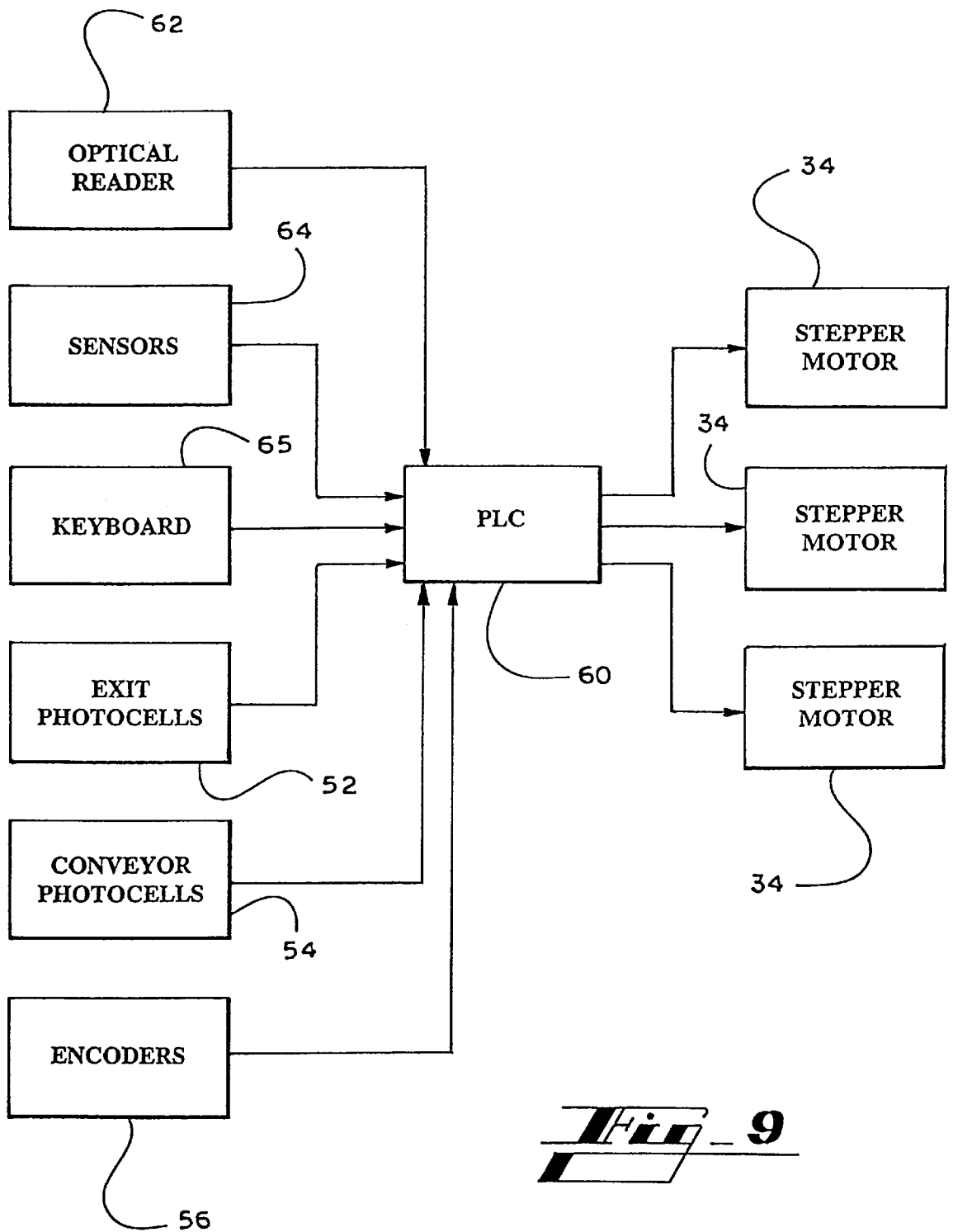

AUTOMATED SHUTTLE SORTER FOR CONVEYORS

CROSS REFERENCE TO RELATED APPLICATION

This application claims priority to and is a divisional application of U.S. patent application Ser. No. 08/905,895, filed Aug. 4, 1997, now issued as U.S. Pat. No. 5,984,078, issued Nov. 16, 1999.

TECHNICAL FIELD

The present invention relates to a conveyor sorter for diverting articles, such as parcels, off a conveyor into destination locations, and more particularly relates to such a conveyor sorter including diverter stations for diverting parcels at high speed to either side of the conveyor, or passing the articles straight through without diversion.

BACKGROUND ART

Package delivery companies pick up millions of packages daily from thousands of locations over a large geographical area and transport them, primarily by truck and airplane, to a correspondingly large number of scattered destinations. To meet a rigorous schedule and provide accurate deliveries, a package delivery company must use automated transfer systems to match incoming packages with proper outgoing transport headed for the packages' destinations. Because deliveries are time sensitive, the sorting equipment must be very fast, yet provide gentle and accurate handling of packages.

Meeting this goal is particularly difficult in the case of large or heavy packages. Some package delivery companies severely restrict the maximum size of packages they will accept for delivery, but United Parcel Service, the assignee of the present application, accepts a wide range of package sizes, shapes and weights.

Belt and roller conveyor systems have often been used in package sorting systems to move packages from incoming loading docks to outgoing transport. An initial sorting of packages traveling along a conveyor may be accomplished by diverting packages from the conveyor based on their destinations, or based on their size or another characteristic.

To automate handling of articles in conveyor systems, conveyor diverter assemblies of various types have been developed. Roller bed diverters using right angle transfer belts are shown in U.S. Pat. No. 4,798,275 to Leemkuil et. al., and U.S. Pat. No. 4,174,774 to Bourgeois. These systems have a relatively large number of moving parts, and repair would be expected to be complex and time consuming.

U.S. Pat. No. 3,926,298, provides a main conveyor having multiple powered wheels, and a diagonal belt conveyor fitted between the wheels below the normal conveyor surface. A section of the drive rollers can be lowered to drop a parcel onto the belt conveyor, without interrupting the speed of articles moving along the primary path. However, the belt conveyor can divert in only one direction.

U.S. Pat. No. 5,547,084 shows a luggage sorting system in which bags are fed onto a moving carriage that includes multiple conveyors. After loading, the carriage moves along a track until it aligns with output conveyors. Then the carriage conveyors shift the bags from the carriage to appropriate output conveyors. This is not a high speed sorting system because the bags must come to rest on the carriage and be transported laterally, and then accelerated again after sorting.

Thus, there is a need in the art for a diverter that can reliably divert large packages from a main conveyor path, using a non-complex mechanism that is modular and easy to repair, all while operating at a high speed of throughput along the main path.

SUMMARY OF THE INVENTION

The present invention seeks to provide an improved conveyor sorting system capable of operating at high conveyor speed and selectively carrying large articles to the side of a main conveyor or straight through the diverting location.

In accordance with the invention, this object is accomplished by providing a system and method for transferring articles moving along a conveyor, including a diverter positioned across the longitudinal axis of the conveyor, the diverter including a transport mechanism; and a shuttle mounted on the transport mechanism, the shuttle including a pass-through element and a diverting element positioned on one side of the pass-through element, the transport mechanism being operative to move the shuttle between a home position in which the pass-through element receives articles from the conveyor and transfers them along the direction of the longitudinal axis, and a diverting position in which the diverting element receives articles from the conveyor and transfers them away from the direction of the longitudinal axis.

In a preferred embodiment, the system includes means for acquiring destination information pertaining to the articles; and a controller selectively operative to operate the transport mechanism in response to the destination information. An optical reader may be positioned to read such destination information printed on a label on the articles. The transport mechanism preferably comprises a reversible belt drive on which the shuttle is mounted. The pass-through element may be a pass-through belt conveyor mounted on a frame carried by the reversible belt of the transport mechanism. The diverting element may be a diverting belt conveyor connected at one end thereof to the frame and extending away from the pass-through conveyor. Preferably, a stationary chute is positioned to receive articles from the diverting conveyor, and a free end of the diverting conveyor spaced apart from the frame moves relative to the stationary chute as the shuttle moves. In the alternative, the diverting element may be a chute, roller conveyor, or other appropriate conveying device rather than the preferred belt conveyor.

In the preferred embodiment, a second diverting element is positioned on the opposite side of the pass-through element. Thus, the transport mechanism can move the shuttle to position either diverting element in the path of oncoming articles and divert them to either side of the main conveyor path.

Multiple diverters may be utilized along the same main conveyor, either intermittently or one after the other.

The present invention also provides a method of transferring articles, comprising the steps of conveying the articles along a conveyor in the direction of a longitudinal axis of the conveyor; and moving a shuttle transverse to the longitudinal axis of the conveyor to place alternatively in the path of the conveyor either a pass-through element or a diverting element positioned on one side of the pass-through element; the pass-through element receiving articles from the conveyor and transferring them along the direction of the longitudinal axis, and the diverting element receiving articles from the conveyor and transferring them away from the direction of the longitudinal axis.

BRIEF DESCRIPTION OF THE DRAWINGS

FIG. 1 shows a top plan view of a diverter station embodying the present invention.

FIG. 2 shows a top plan view of the diverter station of FIG. 1, with one of the diverter belts shifted into position to receive an article.

FIG. 3 is a side elevation view of the diverter station of FIG. 1.

FIG. 4 is a side elevation view of the diverter station of FIG. 1 with a diverter belt shifted to the position shown in FIG. 2.

FIG. 5 is a diagrammatic plan view of a sorting system incorporating a plurality of diverter stations embodying the present invention.

FIG. 6 is a partial pictorial view of the diverter station of FIG. 1, with parts removed to show interior detail.

FIG. 7 is a detail view of an apron and dolly assembly for supporting the free ends of the diverter conveyors of the diverter station of FIG. 1.

FIG. 8 is a diagrammatic plan view of an alternate embodiment of a diverter station in which a chute is the diverter element.

FIG. 9 is a block diagram of a control circuit for operating the diverter stations of a sorting system as shown in FIGS. 1–7.

DETAILED DESCRIPTION

Referring now in more detail to the drawings, in which like numerals refer to like parts throughout the several views, FIG. 1 shows a diverter station 10 embodying the present invention. One or more diverter stations 10 may be incorporated in a conveyor sorter 1 as shown in FIG. 5, between sections of a linear main conveyor 12 supported on a conveyor bed 13. The main conveyor moves objects, such as parcels P, in the direction of arrows A. Each diverter station 10 receives parcels P from a conveyor section 12a of the conveyor 12, and discharges the parcel in one of three directions, namely, to the left (as viewed in the drawings) onto a left output chute 14a, to the right onto a right output chute 14b, or straight through to a downstream section 12b of the conveyor 12. It will be understood that one or both of the output destinations 14a and 14b may be conveyors, receptacles, or the like, rather than chutes. Also, the present invention can be used with many different types of main conveyors, such as belt conveyors and powered roller conveyors.

The diverter stations 10 each include a shuttle 15 that moves transversely to the direction A of the main conveyor 12 in a manner described below. The shuttle 15 has three parcel moving elements, a pass-through conveyor 16, a left diverting conveyor 18 mounted adjacent to the left side of the pass-through conveyor 16 and extending out over the left output chute 14a, and a right diverting conveyor 20 mounted adjacent to the right side of the pass-through conveyor 16 and extending out over the right output chute 14b. The pass-through conveyor 16 is essentially another section of the main conveyor 12, but is mounted on the shuttle 15 so that it can be moved out of alignment with the conveyor 12. The conveyor 16 preferably is a belt conveyor powered by a conventional motorized pulley (not shown), although another type of conveyor, such as a powered roller bed, could be used for the pass-through conveyor 16.

The three conveyor elements 16, 18, and 20 of the shuttle 15 are mounted on a carrier 25 that is in turn mounted on a transport mechanism 30, shown in FIGS. 3 and 6. The transport mechanism 30 includes a timing belt 32 fitted around a pair of notched pulleys 33, one of which is driven by a reversible servo motor 34 by way of a drive belt 35. A plurality of spaced apart support idler rollers 36 are positioned beneath the upper run of the timing belt 32.

The carrier 25 includes an elongate post 40 fixed to the timing belt 32. As best shown in FIG. 6, an H-shaped horizontal frame 42 is attached to the top of the post 40. The frame 42 defines, spaced in slightly from the four extending ends of the "H", four upstanding roller supports 44 for the pulleys of the pass-through conveyor 16. At the extending ends of the "H", four upstanding roller supports 45 are defined for the pulleys of the two diverter conveyors 18 and 20. The diverter conveyor 18 is shown in FIG. 6 with its inner pulley 47 rotatably mounted on a pair of the roller supports 45.

The extending end of each of the diverter conveyors 18 and 20 is fitted with a dolly/apron assembly 48 as shown in FIG. 7 to allow the conveyors 18 and 20 to move freely over the output chutes 14 as the shuttle 15 moves. The assembly 48 includes a pair of dolly brackets 49 rotatably attached to the shafts of the conveyor pulley 47. The brackets 49 are connected by an apron plate 50 which spans the gap between the end of the conveyor 18 or 20 and the chute 14a or 14b. Each bracket 49 extends downwardly to support a wheel 51, so that the end of the conveyor rolls easily along the chute. The apron 50 self-adjusts its orientation by pivoting about the axis of the pulley 47.

The stepper motor 34 may be operated to move the timing belt 32 in either direction from a central position as shown in FIGS. 1 and 3. When the shuttle 15 is in the central position, a parcel P traveling along the main conveyor section 12a will be drawn onto the pass-through conveyor 16 and discharged onto the downstream conveyor section 12b. However, if the motor 34 is operated to carry the shuttle into the left-shifted position shown in FIGS. 2 and 4, the diverter converter conveyor 20 is disposed in the path of the parcel P. When the parcel is deposited onto the conveyor 20, it is carried by the motion of the conveyor 20 over the apron 50 onto the right output chute 14b. The shuttle 15 may be moved into a right-shifted position (not shown), in which in a similar manner, the parcel will be deposited onto the diverter conveyor 18 and carried to the left output chute 14a.

In each of the output chutes, 14a and 14b, an exit confirmation photocell 52 is positioned adjacent to where parcels leave the diverter conveyors 18 and 20. The photocells 52 are retro-reflective photocells that provide a signal when a parcel passes over the photocells. Additional triangular beam photocells 54 are positioned astride the input conveyor section 12a just upstream of the entrance to the diverter station 10, to provide a signal indicating a parcel is entering the diverter station. Optionally, additional photocells (not shown) could be positioned just downstream of the diverter stations 10 to provide a signal when parcels exit the diverter stations onto the output end 12b of the following section of the conveyor 12.

As shown in FIG. 5, a sorting system 1 may be constructed by inserting a plurality of diverter stations 10a, 10b, 10c between main conveyor sections 12a, 12b, 12c, and 12d. In FIG. 5, the diverter station 10a is shown in the central position with the pass-through conveyor 16a located to transfer parcels straight on without diversion. The diverter station 10b is shown positioned to divert a parcel to the right onto the diverter conveyor 20b, and then onto an output chute 114b. The diverter station 10c is shown positioned to divert a parcel to the left onto a diverter conveyor 18c, and then onto an output chute 214a. While three diverter stations 10 are shown in FIG. 5, it should be understood that any number of diverter stations can be included in a sorting system 1.

Referring to the block diagram of FIG. 9, the operation of the diverter station 10 is automated through the use of a digital controller, such as a programmable logic controller 60 (PLC), or a general purpose computer, typically having an appropriate microprocessor. The PLC 60 may receive input signals from an optical reader 62 that reads barcode or two-dimensional symbols (such as MaxiCode symbols) on labels on the parcels P. Such a symbol may contain address information which allows the PLC to determine, in a well known manner, which output chute is the correct chute at which to discharge the parcel. The PLC 60 may also receive information about the parcel directly from sensors 64, such as a scale or a device for measuring the dimensions of the parcel. A set of rotary belt encoders 56 are positioned to measure the displacement of each section of the conveyor 12, and the output of these encoders is input to the PLC 60. Parcel information also may be manually entered at a keyboard 65. The PLC 60, in response to these input signals, sends control signals to each of the diverter stations individually, to operate the motors 34 which move the timing belts, the carriers 25, and conveyor elements 16, 18 and 20.

In operation of a sorter system 1 incorporating a plurality of diverter stations 10, parcels P are placed on the conveyor 12. The PLC receives input from the rotary belt encoders 56 associated with the conveyor 12, and from the optical reader 62 or an alternative label reader or manual input device. The optical reader or other input device is used to acquire destination data about each package as the package is placed onto the sorting system. Any bar codes or other symbols on a parcel are detected and decoded. Destination information may be embedded in a dense code, or may be stored in a database location the address of which is contained in a bar code. Furthermore, textual address information on the parcel label can be analyzed using OCR techniques.

It should be understood that the present invention can utilize a feed mechanism, or the parcels can be placed manually onto the conveyor 12.

When a package is imaged at the reader 62, the current count of the first encoder 56 is obtained. The rotary encoder device 56 allows the PLC to track how far the section of the conveyor 12 has traveled since any particular package was input onto that section. Furthermore, by monitoring which conveyor section the parcel has reached, the PLC can track the location of each parcel as it moves along the conveyor 12 and through diverter stations 10. More specifically, the photocells 54 inform the PLC when a parcel leaves a conveyor section 12a–d and enters a diverter station 10. If the parcel is not scheduled for discharge from that station, the PLC can add the time required for traversing a diverter station to the encoder count and resume monitoring with the next encoder associated with the next conveyor section. Or, a photocell (not shown) can be placed at the entry to the next conveyor section to monitor the entry of the parcel.

A suitable optical reader system for imaging labels is shown in U.S. Pat. Nos. 5,291,564; 5,308,960; 5,327,171; and 5,430,282 which are incorporated herein by reference. Systems for locating and decoding bar codes and the Maxi-Code dense code symbology are described in U.S. Pat. Nos. 4,874,936; 4,896,029; 5,438,188; 5,412,196; 5,412,197; 5,343,028; 5,352,878; 5,404,003; 5,384,451 and PCT Publication No. WO 95/34043.

A record for each package stored in the PLC memory may contain the parcel identification, destination address, and package characteristics. A description of the contents of the parcel, its dimensions and weight, or a code indicating the contents are fragile or hazardous or have some other special status, may be stored.

In the initial or default state of the sorting system 1, the diverter stations 10 are set to send parcels straight through without diversion. The motorized pulleys of the conveyors 16, 18, and 20 of each station preferably are operated continuously while the system is being used, and are coordinated to run the conveyors at approximately the same speed. The speed of the conveyor 12, may be, for example, about 500 feet per minute (about 150 meters per minute).

Once the destination information for the package is known, the PLC 60 looks up in an appropriate part of its memory the proper output chute 14a, 14b, 114a, 114b, 214a, 214b, etc., corresponding to the package's destination, and the diverter station 10 associated with that output chute, as well as the identity of the conveyor section preceding that diverter station. Preferably, this information is stored in fields of the record already created for the package.

In a known manner, the PLC 60 determines when a parcel is approaching a diverter station 10 at which the parcel should be discharged. The PLC reads the encoder counts and photocell 54 signals as the parcel travels, and compares this position information to the discharge location information stored in memory. When the PLC receives signals indicating that the parcel has reached a conveyor section immediately preceding the diverter station 10 from which the parcel should be discharged, the PLC sends control signals to the stepper motor 34 of that station. It will be understood that the PLC need only store three positions of the stepper motor 34 corresponding to alignment of the three conveyors 16, 18 and 20 with the main conveyor 12. If the parcel must go to the left output chute 14a, then the PLC causes the shuttle 15 to be shifted to the right so that the diverter conveyor 18 is in the path of the parcel. The conveyor 18 then carries the parcel away from the main conveyor and discharges it onto the output chute 14a. Similarly, if the parcel must go to the right output chute 14b, then the PLC causes the shuttle to be shifted to the left until the diverter conveyor 20 is aligned with the main conveyor 12, and the parcel is discharged onto the output chute 14b. After the stepper motor 34 receives a command signal from the PLC, the state of the motor 34 may be retained until a change is needed.

In a preferred embodiment, the entire shuttle 15, including the transport mechanism 30, the carrier 25, and the conveyors 16, 18 and 20, are mounted on a movable base (not shown). In the case of a breakdown, sections of the output chutes 14 can be removed without tools, the disabled diverter station 10 can be rolled out of position, and a replacement diverter station 10 can be moved into line, all without tools. This modular construction greatly reduces down time for repairs and therefore increases the productivity of the sorting system 1.

Those skilled in the art will understand that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory In an alternative embodiment, shown diagrammatically in FIG. 8, the diverter conveyors 18 and 20 are replaced by inclined diverter chutes 70, one of which is shown. Preferably, an arcuate guide fence 72 is positioned at the inward end of the chute 70 to change the direction of a parcel P entering the chute 70 from a main conveyor section 12. Parcels P slide from the diverter chute 70 onto one of the output chutes 14.

In another alternative embodiment, not shown, the diverter stations may be positioned adjacent to one another without intervening conveyor belt sections. In this embodiment, the parcels move directly from one diverter station to the next until they are discharged, and the photocells 54 are positioned at the boundary between diverter stations.

From the foregoing, those skilled in the art will understand that the present invention provides a diverter for a conveyor sorting system that can directly and forcefully drive a parcel diagonally to either side of a main conveyor path, or pass the parcel straight through the diverter location, all while operating at a high speed of throughput along the main path. This is accomplished by providing two diverters interleaved or superimposed in the same space, and providing diverting forces toward opposite sides of the conveyor. These diverters can be cycled to provide a net motion straight through the diverter, or operated individually to divert parcels off a selected side of the conveyor.

While this invention has been described in detail with particular reference to a preferred embodiment thereof, it will be understood that modifications and variations may be made without departing from the scope of the invention as defined in the appended claims.

What is claimed is:

1. A method for sorting articles, comprising the steps of:

conveying said articles along a conveyor in the direction of a longitudinal axis of said conveyor; and moving a shuttle transverse to the longitudinal axis of said conveyor to place alternatively in the path of said conveyor either a pass-through element or a diverting element positioned on one side of said pass-through element;

said pass-through element receiving articles from said conveyor and transferring them along the direction of said longitudinal axis, and said diverting element receiving articles from said conveyor and transferring them away from the direction of said longitudinal axis.

2. The method of claim 1, further comprising the steps of:

acquiring destination information pertaining to said articles; and operating said shuttle in response to said destination information.

3. The method of claim 2, wherein said step of acquiring destination information comprises imaging and decoding a label on said articles.

4. The method of claim 1, further comprising the step of receiving articles from said diverting element in a stationary chute, a free end of said diverting element spaced apart from said pass-through element moving relative to said stationary chute as said shuttle moves.

5. The method of claim 4, wherein said diverting element comprises a diverting belt conveyor.

6. The method of claim 4, wherein said diverting element comprises a chute.

7. The method of claim 1, further comprising the step of alternately moving said shuttle to place a second diverting element positioned on an opposite side of said pass-through element in the path of said conveyor.

* * * * *